US012331787B2

(12) United States Patent
Fujiura et al.

(10) Patent No.: US 12,331,787 B2
(45) Date of Patent: Jun. 17, 2025

(54) ROLLING BEARING, ROTATING APPARATUS, BEARING MONITORING APPARATUS AND METHOD FOR MONITORING BEARING

(71) Applicant: MINEBEA MITSUMI Inc., Nagano (JP)

(72) Inventors: Hideo Fujiura, Nagano (JP); Shigeyuki Adachi, Nagano (JP); Toshiaki Asakawa, Shizuoka (JP); Atsushi Kitamura, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 80 days.

(21) Appl. No.: 17/596,448

(22) PCT Filed: Jun. 11, 2020

(86) PCT No.: PCT/JP2020/023085
§ 371 (c)(1),
(2) Date: Dec. 10, 2021

(87) PCT Pub. No.: WO2020/255861
PCT Pub. Date: Dec. 24, 2020

(65) Prior Publication Data
US 2022/0307555 A1    Sep. 29, 2022

(30) Foreign Application Priority Data

Jun. 21, 2019 (JP) .................................. 2019-115678

(51) Int. Cl.
*F16C 41/00* (2006.01)
*F16C 19/16* (2006.01)
*F16C 19/52* (2006.01)

(52) U.S. Cl.
CPC .............. *F16C 41/00* (2013.01); *F16C 19/16* (2013.01); *F16C 19/522* (2013.01); *F16C 2233/00* (2013.01)

(58) Field of Classification Search
CPC ...... F16C 19/52; F16C 19/522; F16C 19/525; F16C 41/00; F16C 2233/00
See application file for complete search history.

(56) References Cited

U.S. PATENT DOCUMENTS

| 4,203,319 A | * | 5/1980 | Lechler | ................. G01L 5/0019 73/862.541 |
| 6,687,623 B2 | * | 2/2004 | Bailey | .................. F16C 19/522 73/862.541 |

(Continued)

FOREIGN PATENT DOCUMENTS

| DE | 102004054201 | * | 5/2006 |
| JP | H08-159151 | | 6/1996 |

(Continued)

OTHER PUBLICATIONS

Translation of DE102004054201 obtained Oct. 16, 2023.*

(Continued)

*Primary Examiner* — James Pilkington
(74) *Attorney, Agent, or Firm* — IPUSA, PLLC

(57) ABSTRACT

A rolling bearing includes an outer ring, an inner ring disposed coaxially with the outer ring, the inner ring being on an inner peripheral side of the outer ring. The rolling bearing includes multiple rolling elements disposed between the outer ring and the inner ring. The rolling bearing includes a strain gauge configured to detect strain of the outer ring or the inner ring. The strain gauge includes a resistor formed of a Cr composite film.

11 Claims, 16 Drawing Sheets

(56) References Cited

U.S. PATENT DOCUMENTS

| | | | | |
|---|---|---|---|---|
| 7,316,168 | B2* | 1/2008 | van der Knokke | F16C 33/586 |
| | | | | 73/862.68 |
| 9,841,329 | B2* | 12/2017 | Stansloski | G01L 5/162 |
| 10,684,192 | B2* | 6/2020 | Elmose | G01M 13/04 |
| 11,543,308 | B2* | 1/2023 | Yuguchi | H01C 7/006 |
| 2006/0243068 | A1 | 11/2006 | Ueno et al. | |
| 2006/0257060 | A1 | 11/2006 | Gempper et al. | |
| 2007/0277612 | A1 | 12/2007 | Ehrfeld et al. | |
| 2008/0317396 | A1* | 12/2008 | Pecher | G01P 13/00 |
| | | | | 702/150 |
| 2011/0214513 | A1 | 9/2011 | Ikki et al. | |
| 2012/0014632 | A1 | 1/2012 | Nishikawa et al. | |
| 2020/0325571 | A1 | 10/2020 | Asakawa et al. | |

FOREIGN PATENT DOCUMENTS

| | | |
|---|---|---|
| JP | 2004-061117 | 2/2004 |
| JP | 2006-526157 | 11/2006 |
| JP | 2007-032705 | 2/2007 |
| JP | 2008-508540 | 3/2008 |
| JP | 2010-127376 | 6/2010 |
| JP | 4535290 | 9/2010 |
| JP | 2010-243190 | 10/2010 |
| JP | 2019-066311 | 4/2019 |
| WO | WO-2019065841 A1 * 4/2019 ............... G01B 7/16 |

OTHER PUBLICATIONS

International Search Report for PCT/JP2020/023085 mailed on Aug. 25, 2020.
Extended European Search Report dated Jun. 13, 2022 with respect to the corresponding European application No. 20826357.4.
Office Action dated Jul. 5, 2022 with respect to the corresponding Japanese patent application No. 2019-115678.

* cited by examiner

ROLLING BEARING, ROTATING APPARATUS, BEARING MONITORING APPARATUS AND METHOD FOR MONITORING BEARING

TECHNICAL FIELD

The present invention relates to a rolling bearing, a rotating apparatus, a bearing monitoring apparatus, and a method for monitoring a bearing.

BACKGROUND

A rolling bearing is known to include an outer ring having a race on an inner peripheral side of the outer ring, an inner ring having a race on an outer peripheral side of the inner ring, rolling elements interposed between the race of the outer ring and the race of the inner ring, and a strain gauge that can be attached to a surface of the outer ring or the inner ring. In such a rolling bearing, the strain gauge is configured by providing a conductive line on an insulating film, where multiple high-resistivity resistors that are finely linear and that are made of a thin metal film are each provided at an intermediate portion of a conductive line path (see, for example, Patent Document 1).

CITATION LIST

[Patent Document]
[Patent Document 1] Japanese Unexamined Patent Application Publication No. 2007-32705

SUMMARY

The outer ring and the inner ring of the rolling bearing are each formed of a material having great stiffness. When the strain gauge is used for a measurement object formed of a material having great stiffness, it is required to have high sensitivity. However, the conventional strain gauge does not have sufficient sensitivity and consequently cannot accurately detect strain of the rolling bearing. Thus, it is difficult to provide a practical application of the strain gauge.

In view of the point described above, an object of the present invention is to provide a rolling bearing having a function of detecting strain accurately.

A rolling bearing includes an outer ring and an inner ring disposed coaxially with the outer ring, the inner ring being on an inner peripheral side of the outer ring. The rolling bearing includes multiple rolling elements disposed between the outer ring and the inner ring. The rolling bearing includes a strain gauge configured to detect strain of the outer ring or the inner ring. The strain gauge includes at least one resistor formed of a Cr composite film.

Effects of the Invention

According to the disclosed techniques, a rolling bearing having a function of detecting strain accurately can be provided.

DESCRIPTION OF EMBODIMENTS

Figure 1:
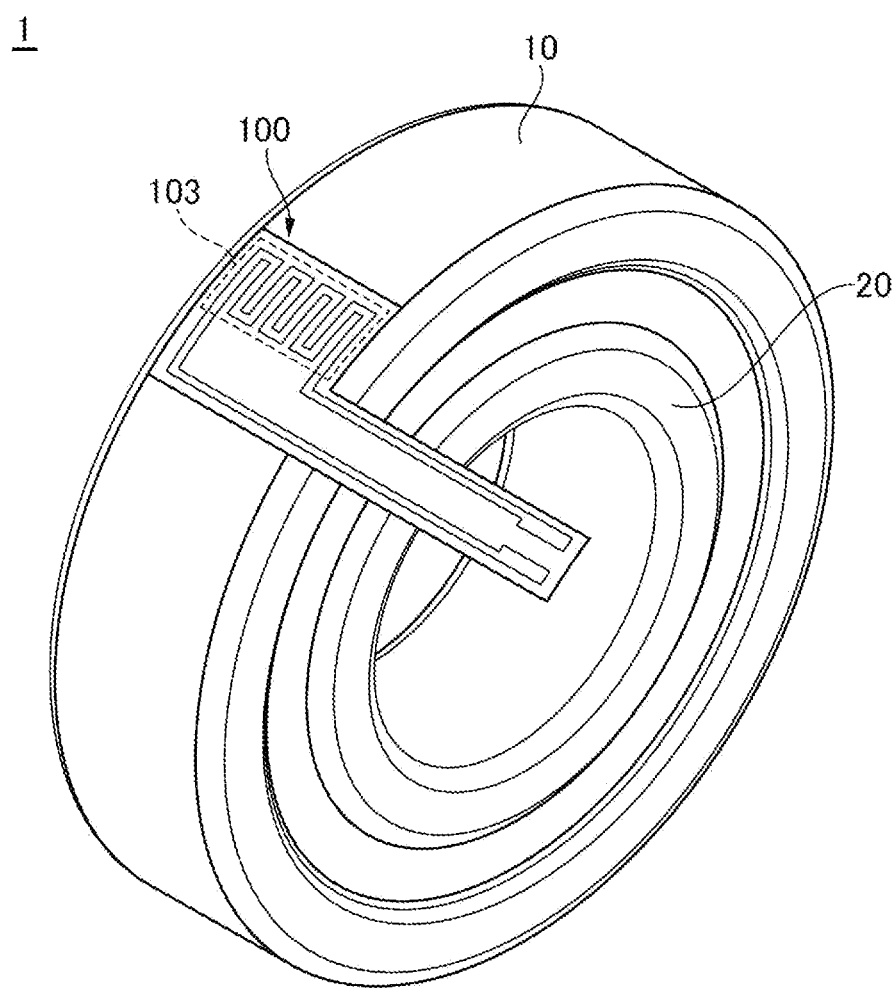
FIG. 1 is a perspective view of an example of a rolling bearing according to a first embodiment.

Hereinafter, one or more embodiments for carrying out the invention will be described with reference to the drawings. In each drawing, the same components are indicated by the same reference numerals and duplicate description thereof may be omitted.

First Embodiment

Figure 2:
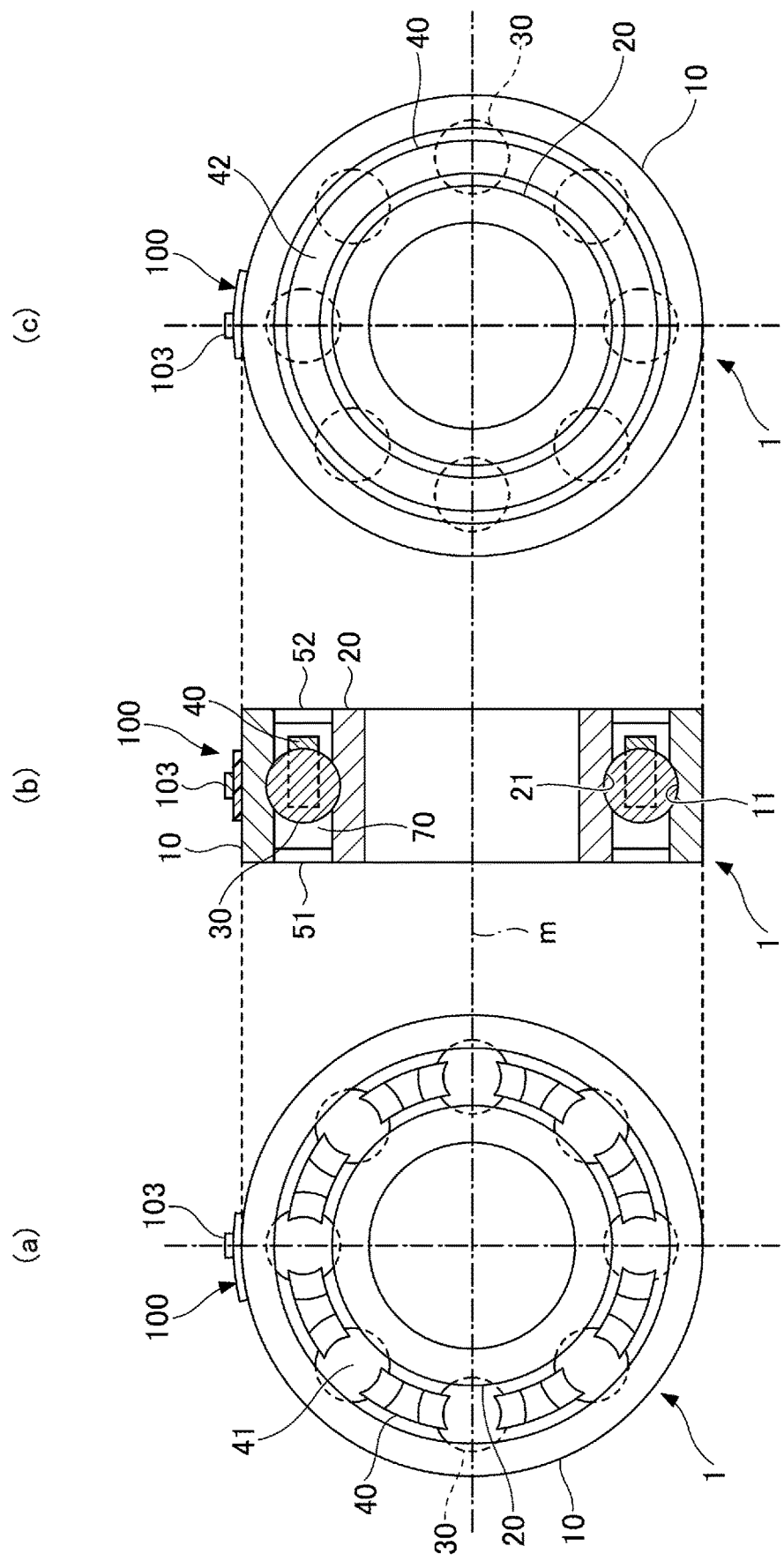
FIG. 2 is a diagram illustrating an example of the rolling bearing according to the first embodiment.

[Rolling Bearing]
FIG. 1 is a perspective view of an example of a rolling bearing according to a first embodiment.
FIG. 2 is a diagram illustrating an example of the rolling bearing according to the first embodiment. (a) of FIG. 2 is a front view of the rolling bearing, (b) of FIG. 2 is a cross-sectional view of the rolling bearing, and (c) of FIG. 2 is a back view of the rolling bearing.

Referring to FIG. 1 and FIG. 2, a rolling bearing 1 includes an outer ring 10, an inner ring 20, multiple rolling elements 30, a holder 40, seals 51 and 52, and a strain gauge 100. In (a) of FIG. 2 and (c) of FIG. 2, illustration of the seals 51 and 52 are omitted for the sake of convenience.

The outer ring 10 has a cylindrical structure of which a central axis is a rotation axis m. The inner ring 20 has a cylindrical structure that is disposed coaxially with the outer ring 10 and that is provided on an inner peripheral side of the outer ring 10. Each of the rolling elements 30 is a sphere disposed in a race 70 formed between the outer ring 10 and the inner ring 20. A lubricant (not illustrated) such as grease is applied to the race 70. The seals 51 and 52 protrude from the inner peripheral surface of the outer ring 10 toward the inner ring 20 to isolate the race 70 from the outside.

On the inner peripheral surface of the outer ring 10, a recessed portion 11 of which a cross-sectional shape is an arc shape is formed in a circumferential direction of the outer ring 10. A recessed portion 21 of which a cross-sectional shape is an arc shape is formed in a circumferential direction of the inner ring 20 and on an outer peripheral surface of the inner ring 20. The rolling elements 30 are guided in the circumferential direction by the recessed portions 11 and 21.

The holder 40 is disposed in the race 70 to hold the rolling elements 30. Specifically, the holder 40 is an annular element disposed coaxially with the rotation axis m. One side of the holder 40 in a direction of the rotation axis m includes recessed portions 41 for accommodating the respective rolling elements 30, and the other side of the holder 40 includes a back surface 42 continuously provided in a circumferential direction of the annular element.

A strain gauge 100 is a sensor that detects strain of the outer ring 10 or the inner ring 20, and includes a resistor 103 that serves as a sensitive portion. In the present embodiment, the strain gauge 100 is attached to the outer peripheral surface of the outer ring 10, and detects strain of the outer ring 10 as changes in a resistance value of the resistor 103.

In the strain gauge 100, the resistor 103 of which a longitudinal direction (longitudinal direction of a gauge) is directed to a circumferential direction of the outer ring 10 is disposed. The outer ring 10 in the circumferential direction thereof is likely to be stretched and contracted in comparison to the outer ring in an axial direction thereof, and thus by disposing the resistor of which the longitudinal direction is directed to the circumferential direction of the outer ring 10, a great distorted waveform can be obtained.

By monitoring the output of the strain gauge 100 with an external device, an operation state of the rolling bearing 1 can be monitored. The strain gauge 100 will be described below in detail.

Figure 3:
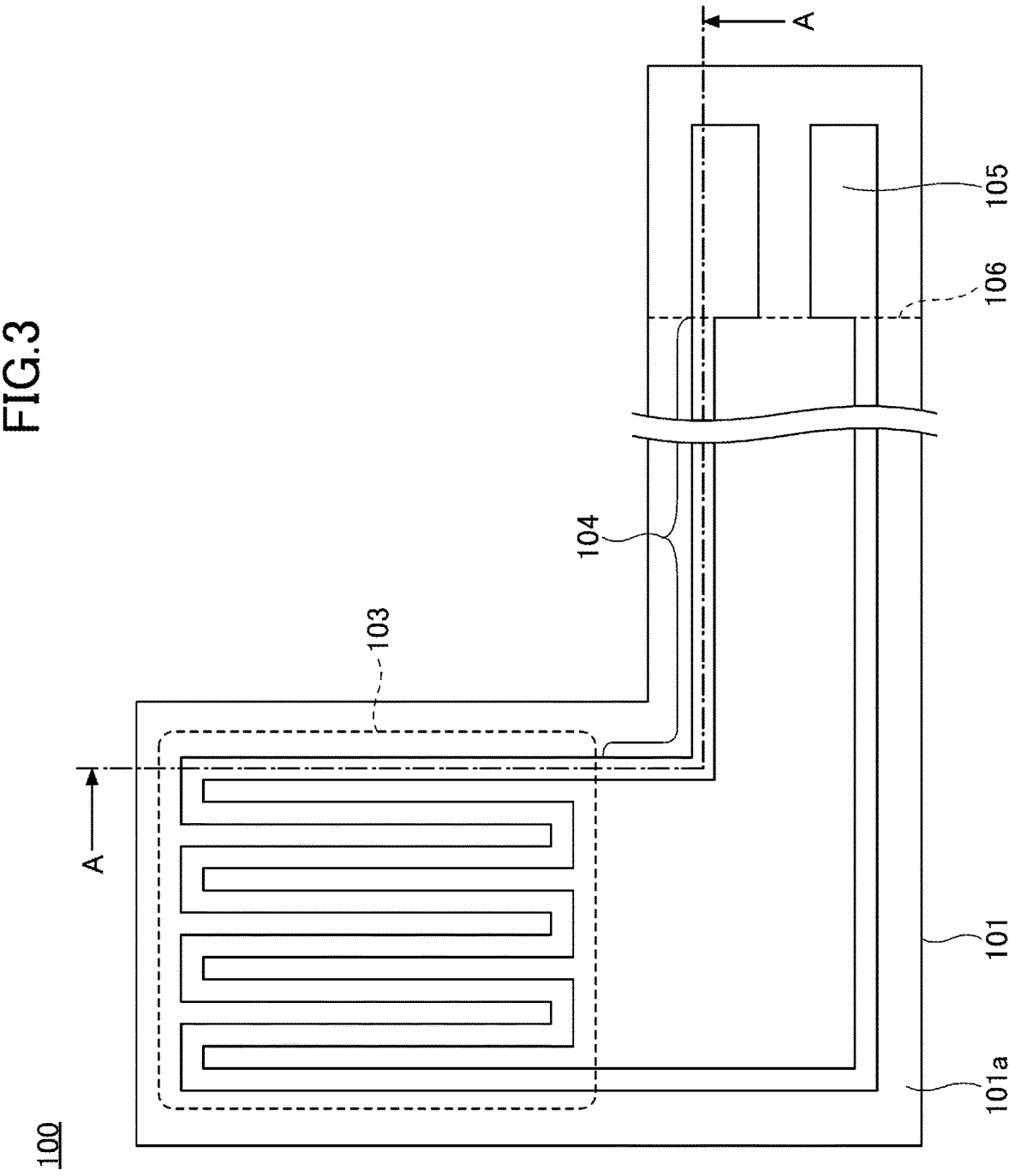
FIG. 3 is a plan view of an example of a strain gauge according to the first embodiment.
Figure 4:
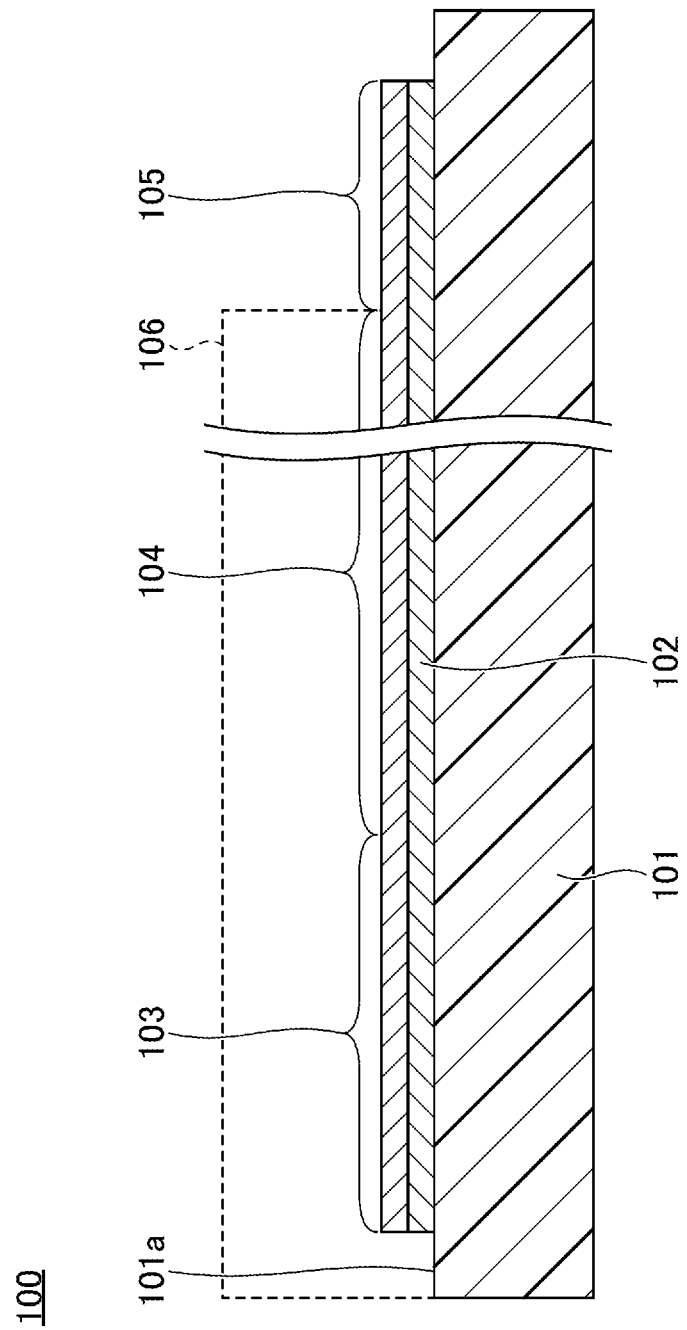
FIG. 4 is a cross-sectional view of an example of the strain gauge according to the first embodiment.

FIG. 3 is a plan view of an example of the strain gauge according to the first embodiment. FIG. 4 is a cross-sectional view of an example of the strain gauge according to the first embodiment, and illustrates a cross section taken along the A-A line in FIG. 3. Referring to FIG. 3 and FIG. 4, the strain gauge 100 includes a substrate 101, a functional layer 102, the resistor 103, lines 104 and terminal sections 105. The functional layer 102 may be provided as needed.

In the present embodiment, for the sake of convenience, with respect to the strain gauge 100, the side of the substrate 101 where the resistor 103 is provided is referred to as an upper side or one side, and the side of the substrate 101 where the resistor 103 is not provided is referred to as a lower side or another side. Further, for each component, the surface on the side where the resistor 103 is provided is referred to as one surface or an upper surface, and the surface on the side where the resistor 103 is not provided is referred to as another surface or a lower surface. However, the strain gauge 100 can be used in a state of being upside down, or can be disposed at any angle. Further, a plan view means that an object is viewed from a direction normal to an upper surface 101a of the substrate 101, and a planar shape refers to a shape of an object when viewed from the direction normal to the upper surface 101a of the substrate 101.

The substrate 101 is a member that is a base layer for forming the resistor 103 or the like and is flexible. The thickness of the substrate 101 is not particularly restricted, and can be appropriately selected for any purpose. For example, such a thickness can be approximately between 5 μm and 500 μm. In particular, when the thickness of the substrate 101 is between 5 μm and 200 μm, it is preferable in terms of strain transfer from a flexure element surface that is bonded to a lower surface of the substrate 101 via an adhesive layer or the like, and dimensional stability with respect to environment, and when the thickness is 10 μm or more, it is further preferable in terms of insulation.

The substrate 101 can be formed of an insulating resin film such as a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, or a polyolefin resin. The film refers to a flexible member having a thickness of about 500 μm or less.

Here, the "formed of an insulating resin film" is not intended to preclude the substrate 101 from containing fillers, impurities, or the like in the insulating resin film. The substrate 101 may be formed of, for example, an insulating resin film containing fillers such as silica or alumina.

The functional layer 102 is formed, as a lower layer of the resistor 103, on the upper surface 101a of the substrate 101. In such a manner, the planar shape of the functional layer 102 is approximately the same as the planar shape of the resistor 103 illustrated in FIG. 3. The thickness of the functional layer 102 may be, for example, about 1 nm to 100 nm.

In the present application, the functional layer refers to a layer that has a function of promoting crystal growth of the resistor 103 that is at least an upper layer. The functional layer 102 preferably further has a function of preventing oxidation of the resistor 103 caused by oxygen and moisture included in the substrate 101, as well as a function of improving adhesion between the substrate 101 and the resistor 103. The functional layer 102 may further have other functions.

The insulating resin film that constitutes the substrate 101 contains oxygen and moisture. In this regard, particularly when the resistor 103 includes Cr (chromium), it is effective for the functional layer 102 to have a function of preventing oxidation of the resistor 103, because Cr forms an autoxidized film.

The material of the functional layer 102 is not particularly restricted as long as it is material having a function of promoting crystal growth of the resistor 103 that is at least an upper layer. Such material can be appropriately selected for any purpose, and includes one or more types of metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The resistor 103 is a thin film formed, in a predetermined pattern, on the upper surface of the functional layer 102, and is a sensitive portion at which resistance changes in accordance with strain.

The resistor 103 is formed of a Cr composite film. The Cr composite film is a composite film of Cr, CrN, $Cr_2N$, and the like. The Cr composite film may include incidental impurities such as chromium oxide. A portion of the material constituting the functional layer 102 may be diffused into the Cr composite film.

In this case, the material constituting the functional layer 102 and nitrogen may form a compound. For example, when the functional layer 102 is formed of Ti, the Cr composite film may include Ti or TiN (titanium nitride).

The thickness of the resistor 103 is not particularly restricted, and can be appropriately selected for any purpose. The thickness can be, for example, approximately between 0.05 μm and 2 μm. In particular, when the thickness of the resistor 103 is 0.1 μm or more, it is preferable in terms of increases in crystallinity (e.g., crystallinity of α-Cr) of a crystal that constitutes the resistor 103. When the thickness of the resistor 103 is 1 μm or less, it is further preferable in terms of reductions in cracks of a given film caused by internal stress of the film that constitutes the resistor 103, or reductions in warp in the substrate 101.

By forming the resistor 103 on the functional layer 102, the resistor 103 can be formed by a stable crystalline phase and thus stability of gauge characteristics (a gauge factor, a gauge factor temperature coefficient TCS, and a temperature coefficient of resistance TCR) can be increased.

For example, when the resistor 103 is the Cr composite film, by providing the functional layer 102, the resistor 103 can be formed with α-Cr (alpha-chromium) as the main component. The α-Cr has a stable crystalline phase and thus stability of gauge characteristics can be increased.

Here, a main component means that a target substance is 50% by weight or more of total substances that constitute the resistor. The resistor 103 preferably includes α-Cr at 80% by weight or more, from the viewpoint of increasing the gauge characteristics. Note that α-Cr is Cr having a bcc structure (body-centered cubic structure).

Also, by diffusing a metal (e.g., Ti) that constitutes the functional layer 102 into the Cr composite film, the gauge characteristics can be increased. Specifically, the gauge factor of the strain gauge 100 can be 10 or more, as well as the gauge factor temperature coefficient TCS and temperature coefficient of resistance TCR being each in the range of from −1000 ppm/° C. to +1000 ppm/C.

Terminal sections 105 respectively extend from both end portions of the resistor 103, via the lines 104 and are each wider than the resistor 103 and a given line 104 to be in an approximately rectangular shape, in a plan view. The terminal sections 105 are a pair of electrodes for externally outputting changes in a resistance value of the resistor 103 in accordance with strain, where, for example, a lead wire for an external connection, or the like is joined. For example, the resistor 103 extends from one terminal section 105 and one line 104, with zigzagged hairpin turns, to be connected to another line 104 and another terminal section 105. The upper surface of each terminal section 105 may be coated with a metal allowing for greater solderability than the terminal section 105. Note that for the sake of convenience, the resistor 103, the lines 104, and the terminal sections 105 are expressed by different numerals. However, the resistor, the lines, and the terminal sections can be integrally formed of the same material, in the same process.

A cover layer 106 (insulating resin layer) may be provided on and above the upper surface 101a of the substrate 101, such that the resistor 103 and the lines 104 are coated and the terminal sections 105 are exposed. By providing the cover layer 106, mechanical damage and the like can be prevented from occurring in the resistor 103 and the lines 104. Also, by providing the cover layer 106, the resistor 103 and the lines 104 can be protected against moisture and the like. The cover layer 106 may be provided to cover all portions except for the terminal sections 105.

The cover layer 106 can be formed of an insulating resin such as a PI resin, an epoxy resin, a PEEK resin, a PEN resin, a PET resin; or a PPS resin, a composite resin (e.g., a silicone resin or a polyolefin resin). The cover layer 106 may contain fillers or pigments. The thickness of the cover layer 106 is not particularly restricted, and can be appropriately selected for any purpose. For example, the thickness may be approximately between 2 μm and 30 μm.

In order to manufacture the strain gauge 100, first, the substrate 101 is prepared and the functional layer 102 is formed on the upper surface 101a of the substrate 101. The material and thickness for each of the substrate 101 and the functional layer 102 are the same as the material and thickness described above. The functional layer 102 may be provided as necessary.

The functional layer 102 can be vacuum-deposited by, for example, conventional sputtering in which a raw material capable of forming the functional layer 102 is a target and in which an Ar (argon) gas is supplied to a chamber. By using conventional sputtering, the functional layer 102 is deposited while the upper surface 101a of the substrate 101 is etched with Ar. Thus, a deposited amount of film of the functional layer 102 is minimized and thus an effect of increasing adhesion can be obtained.

However, this is an example of a method of depositing the functional layer 102, and the functional layer 102 may be formed by other methods. For example, as such a method, before depositing the functional layer 102, the upper surface 101a of the substrate 101 is activated by plasma treatment or the like using Ar or the like to thereby obtain the effect of increasing the adhesion, and subsequently the functional layer 102 may be vacuum-deposited by magnetron sputtering.

Next, a metallic layer that includes the resistor 103, the lines 104, and the terminal sections 105 is formed on the entire upper surface of the functional layer 102, and then the functional layer 102, the resistor 103, the lines 104, and the terminal sections 105 are each patterned in the planar shape as illustrated in FIG. 3, by photolithography. The material and thickness for each of the resistor 103, the lines 104, and the terminal sections 105 are the same as the material and thickness described above. The resistor 103, the lines 104, and the terminal sections 105 can be integrally formed of the same material. The resistor 103, the lines 104, and the terminal sections 105 can be deposited by, for example, magnetron sputtering in which a raw material capable of forming the resistor 103, the lines 104, and the terminal sections 105 is a target. Instead of the magnetron sputtering, the resistor 103, the lines 104, and the terminal sections 105 may be deposited by reactive sputtering, vapor deposition, arc ion plating, pulsed laser deposition, or the like.

A combination of the material of the functional layer 102 and the material of the resistor 103, the lines 104, and the terminal sections 105 is not particularly restricted, and can be appropriately selected for any purpose. For example, Ti is used for the functional layer 102, and a Cr composite film formed with α-Cr (alpha-chromium) as the main component can be deposited as the resistor 103, the lines 104, and the terminal sections 105.

In this case, each of the resistor 103, the lines 104, and the terminal sections 105 can be deposited by, for example, magnetron sputtering in which a raw material capable of forming the Cr composite film is the target and in which an Ar gas is supplied to a chamber. Alternatively, the resistor 103, the lines 104, and the terminal sections 105 may be deposited by reactive sputtering in which pure Cr is the target and in which an appropriate amount of nitrogen gas, as well as an Ar gas, are supplied to a chamber.

In such methods, a growth face of the Cr composite film is defined by the functional layer 102 formed of Ti, and a Cr composite film that is formed with α-Cr as the main component having a stable crystalline structure can be deposited. Also, Ti that constitutes the functional layer 102 is diffused into the Cr composite film, so that the gauge characteristics are increased. For example, the gauge factor of the strain gauge 100 can be 10 or more, as well as the gauge factor temperature coefficient TCS and temperature coefficient of resistance TCR being each in the range of from −1000 ppm/° C. to +1000 ppm/° C.

When the resistor 103 is a Cr composite film, the functional layer 102 formed of Ti includes all functions of a function of promoting crystal growth of the resistor 103, a function of preventing oxidation of the resistor 103 caused by oxygen or moisture contained in the substrate 101, and a function of increasing adhesion between the substrate 101 and the resistor 103. Instead of Ti, when the functional layer 102 is formed of Ta, Si, Al, or Fe, the functional layer also includes the same functions.

Subsequently, the cover layer 106 with which the resistor 103 and the lines 104 are coated and that exposes the terminal sections 105 is provided on and above the upper surface 101a of the substrate 101, as necessary, so that the strain gauge 100 is completed.

For example, the cover layer 106 can be fabricated such that a thermosetting insulating resin film in a semi-cured state is laminated on the upper surface 101a of the substrate 101, and such that the resistor 103 and the lines 104 are coated and the terminal sections 105 are exposed; subsequently, heat is added and curing is performed. The cover layer 106 may be formed such that a thermosetting insulating resin that is liquid or paste-like is applied to the upper surface 101a of the substrate 101, and such that the resistor 103 and the lines 104 are coated therewith and the terminal sections 105 are exposed; subsequently, heat is added and curing is performed.

As described above, by providing the functional layer 102 in the lower layer of the resistor 103, the crystal growth of the resistor 103 can be promoted and thus the resistor 103 having a stable crystalline phase can be fabricated. As a result, in the strain gauge 100, the stability of the gauge characteristics can be increased. Also, the material that constitutes the functional layer 102 is diffused into the resistor 103, so that the gauge characteristics of the strain gauge 100 can be thereby increased.

[Bearing Monitoring Apparatus]

Figure 5:
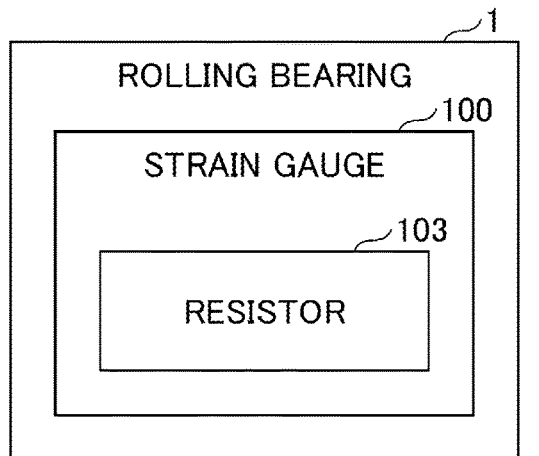
FIG. 5 is a block diagram illustrating an example of a bearing monitoring apparatus according to the first embodiment.

FIG. 5 is a block diagram illustrating an example of a bearing monitoring apparatus according to the first embodiment. Referring to FIG. 5, a bearing monitoring apparatus 200 includes the rolling bearing 1, an analog front end 210, and an arithmetic unit 220.

In the bearing monitoring apparatus 200, a pair of terminal sections 105 in the strain gauge 100 for the rolling bearing 1 are connected to the analog front end 210 by, for example, a flexible substrate, a lead wire, or the like.

The analog front end 210 includes, for example, a bridge circuit 211, an amplifier circuit 212, an A/D converter circuit (analog-to-digital converter circuit) 213, an interface 214, and the like, and generates a distorted waveform based on the output of the resistor 103. The analog front end 210 may include a temperature compensating circuit. The analog front end 210 may be constituted by one or more ICs, or may be configured by individual components.

In the analog front end 210, for example, the pair of terminal sections 105 in the strain gauge, 100 is connected to the bridge circuit 211. In other words, one side of the bridge circuit 211 is constituted by the resistor 103 between the pair of terminal sections 105, and the other three sides are each constituted by fixed resistance. With this arrangement, the distorted waveform (analog signal) corresponding to a resistance value of the resistor 103 can be obtained as the output of the bridge circuit 211. The analog front end 210 is a representative example of a waveform generator according to the present invention.

After the distorted waveform output from the bridge circuit 211 is amplified by the amplifier circuit 212, the amplified distorted waveform is converted into a digital signal by the A/D converter circuit 213. Then, the digital signal is output to the arithmetic unit 220 through the interface 214 by serial communication such as $I^2C$. When the analog front end 210 includes a temperature compensating circuit, a temperature-compensated digital signal is transmitted to the arithmetic unit 220.

The arithmetic unit 220 performs arithmetic processing with respect to the digitized distorted waveform that is transmitted from the analog front end 210, and monitors an operation state of the rolling bearing 1. The arithmetic processing includes, for example, calculating of an amplitude or a period, or comparing of the amplitude or period against a reference value. The arithmetic unit 220 monitors the operational state of the rolling bearing 1 based on, for example, the amplitude or period of the digitized distorted waveform.

Figure 6:
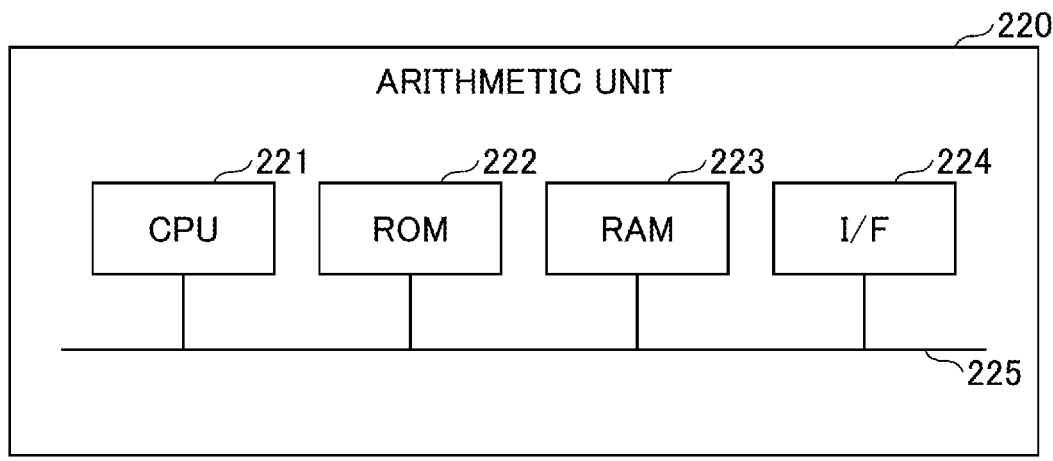
FIG. 6 is a hardware block diagram of an arithmetic unit according to the first embodiment.

FIG. 6 is a hardware block diagram of an example of the arithmetic unit according to the first embodiment. As illustrated in FIG. 6, the arithmetic unit 220 includes main components that are a central processing unit (CPU) 221, a read only memory (ROM) 222, a random access memory (RAM) 223, an interface (I/F) 224, and a bus line 225. The CPU 221, the ROM 222, the RAM 223, and the I/F 224 are interconnected via the bus line 225. The arithmetic unit 220 may have another hardware block as necessary.

The CPU 221 controls each function of the arithmetic unit 220. The ROM 222, which is a storage device, stores a program that causes the CPU 221 to control each function of the arithmetic unit 220, as well as storing various information. The RAM 223, which is a storage device, is used as a work area or the like of the CPU 221. The RAM 223 can temporarily store predetermined information. The I/F 224 is an interface for coupling to another device or the like. For example, the I/F 224 is coupled with the analog front end 210, an external network, or the like.

The arithmetic unit 220 may be a processor programmed to implement each function by software, as in a processor that is implemented by an electronic circuit. The arithmetic unit 220 may include an application specific integrated circuit (ASIC) designed to implement a predetermined function. The arithmetic unit 220 may include a digital signal processor (DSP), a field programmable gate array (FPGA), a system on a chip (SOC), or a graphics processing unit (GPU). The arithmetic unit 220 may be a circuit module or the like.

Figure 7:
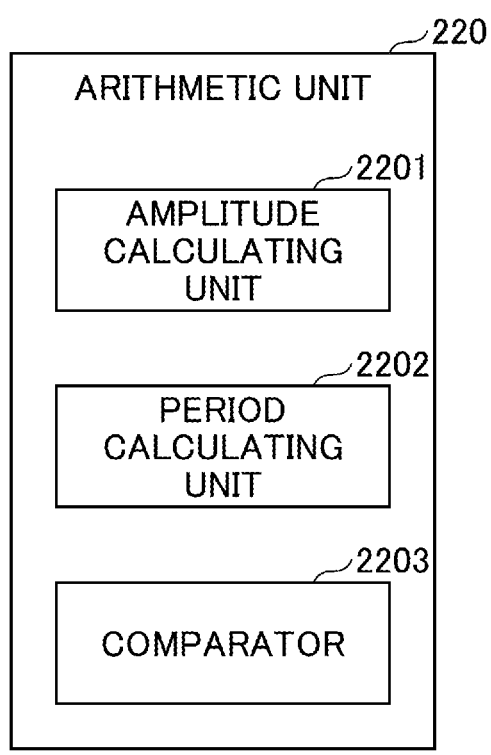
FIG. 7 is a functional block diagram of the arithmetic unit according to the first embodiment.

FIG. 7 is a functional block diagram of an example of the arithmetic unit according to the first embodiment. As illustrated in FIG. 7, the arithmetic unit 220 includes main functional blocks that are an amplitude calculating unit 2201, a period calculating unit 2202, and a comparator 2203. The arithmetic unit 220 may include another functional block as necessary.

The amplitude calculating unit 2201 includes a function of calculating the amplitude of a given digitized distorted waveform. The period calculating unit 2202 includes a function of calculating a period of the digitized distorted waveform. The comparator 2203 includes a function of comparing at least one among an amplitude that the amplitude calculating unit 2201 calculates and a period that the period calculating unit 2202 calculates, against a predetermined reference value. The arithmetic unit 220 may have another function as necessary.

Figure 8:
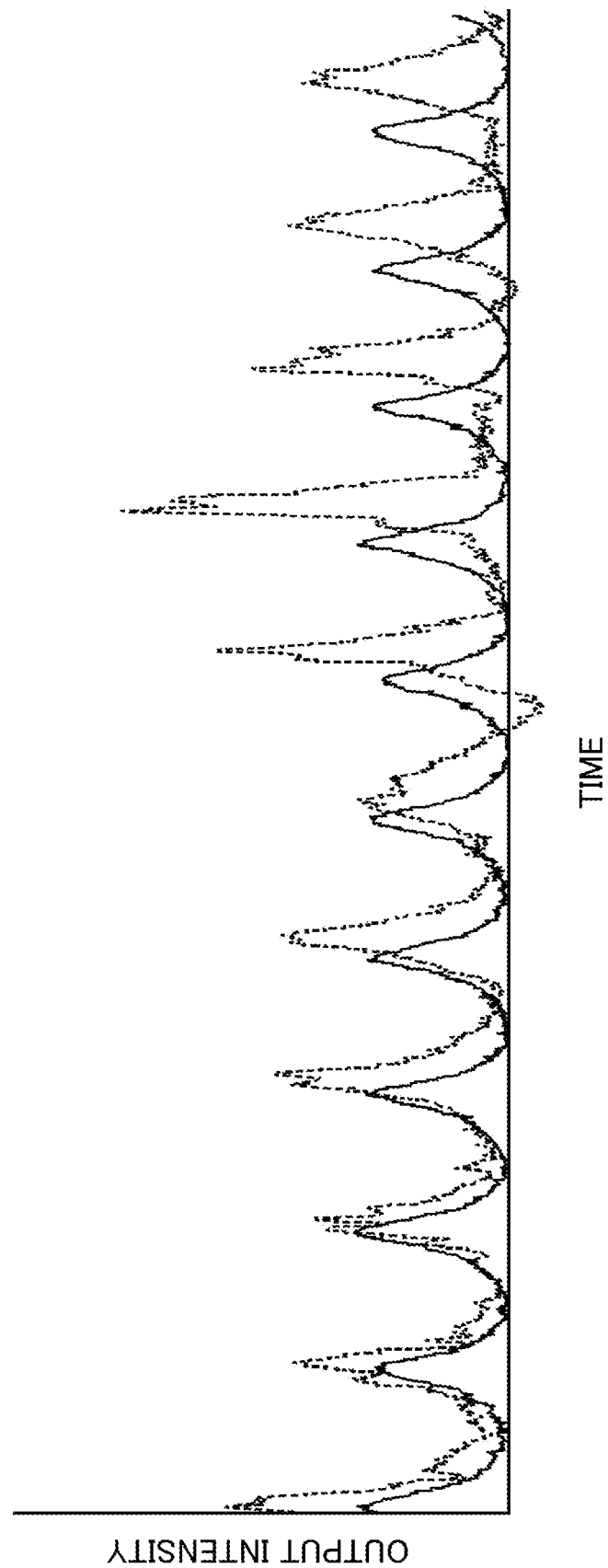
FIG. 8 is a diagram illustrating an example of distorted waveforms generated by an analog front end.

FIG. 8 is a diagram illustrating an example of distorted waveforms generated by the analog front end. In FIG. 8, the solid line expresses an initial distorted waveform, and the dashed line expresses a distorted waveform obtained after operations for a predetermined time period. The distorted waveforms, as expressed by the solid line and dashed line, are periodic waveforms of which peaks and bottoms are repeated. When each rolling element 30 passes directly beneath the resistor 103 of the strain gauge 100, the peak for a strain amount (output intensity) is obtained. Also, the bottom is obtained at an intermediate position between rolling elements 30 that are next to each other. A rotation speed of the rolling bearing 1 can be determined by detecting the number of peaks for the strain amount that appear during a fixed time period.

As illustrated in FIG. 8, variations in each of an amplitude and period for the initial distorted waveform are small, while variations in each of the amplitude and period for a distorted waveform that is obtained after the operations for a predetermined time period are greater. For the distorted waveform obtained after the operations for the predetermined time period, variations in the period are considered to become greater due to changes in a motion of each rolling element 30 with time, which results from wear of the holder 40, or application or the like of a lubricant such as grease to the race 70.

Additionally, for the distorted waveform obtained after the operations for the predetermined time period, variations in the amplitude are considered to become greater with time, which results from wear of one or more rolling elements. 30, the outer ring 10, and the inner ring 20, or, application or the like of a lubricant, such as grease, to the race 70.

Thus, variations in each of the amplitude and period of the distorted waveform change with time. In view of the point described above, the arithmetic unit 220 can monitor an operation state of the rolling bearing 1 based on at least one among the amplitude and period of the distorted waveform.

Figure 9:
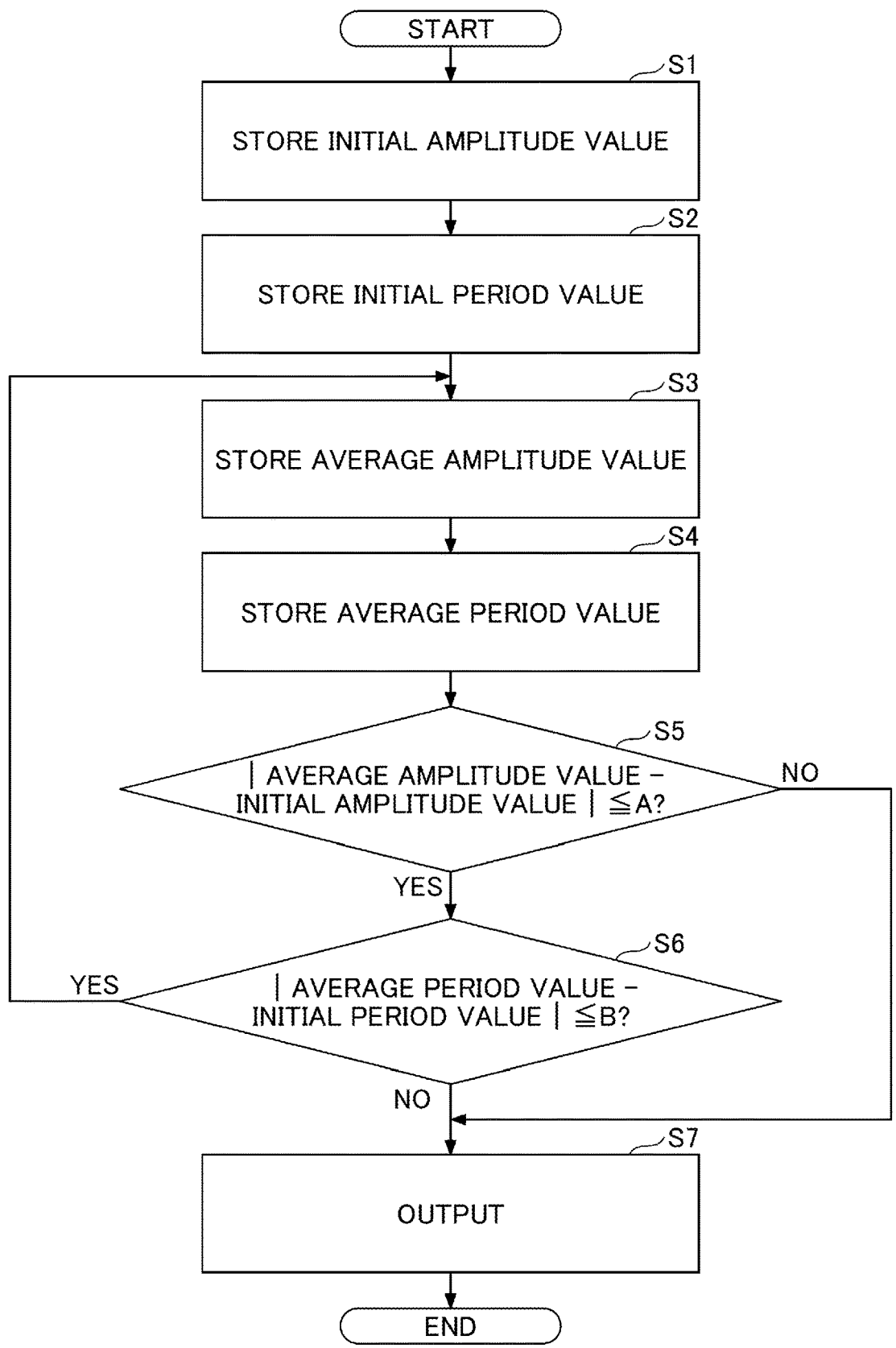
FIG. 9 is a flowchart illustrating an example of a method for monitoring a bearing by the bearing monitoring apparatus according to the first embodiment.

FIG. 9 is a flowchart illustrating an example of the method for monitoring a bearing by the bearing monitoring apparatus according to the first embodiment. In step S1 illustrated in FIG. 9, the analog front end 210 generates an initial distorted waveform. The amplitude calculating unit 2201 calculates an average amplitude value for the initial distorted waveform and stores it as an initial amplitude value in the RAM or the like.

Next, in step S2, the period calculating unit 2202 calculates an average value of periods for the initial distorted waveform that the analog front end 210 generates in step S1, and stores it in the RAM or the like as an initial period value. A given amplitude can be obtained by, for example, peak detection, and a given period can be obtained by measuring a time period between adjacent peaks.

Next, in step S3, the analog front end 210 generates a distorted waveform after the passage of a predetermined time period. The amplitude calculating unit 2201 calculates an average value of amplitudes for the distorted waveform after the passage of the predetermined time period, and stores it in the RAM or the like as an average amplitude value.

Next, in step S4, the period calculating unit 2202 calculates an average value of periods for the distorted waveform that is obtained after the passage of the predetermined time period and that is generated by the analog front end 210 in step. S3, and stores it in the RAM or the like as an average period value.

Next, in step S5, the comparator 2203 performs arithmetic processing with respect to the distorted waveforms and monitors an operation state of the rolling bearing 1. Specifically, the comparator 2203 retrieves the initial amplitude value and the average amplitude value from the RAM or the like, and determines whether | average amplitude value−initial amplitude value |≤A is satisfied. A is a value for determining whether a lifetime of the rolling bearing 1 is reached, and is determined by experiment or the like. The A is preliminarily stored in the RAM or the like.

In step S5, if | average amplitude value−initial amplitude value| exceeds A (NO), the process proceeds to step S7, and the comparator 2203 externally outputs an indication that the lifetime of the rolling bearing 1 is reached (data output, generation of an alarm sound, lighting of a warning light, or the like). In step S5, if the | average amplitude value−initial amplitude value| is A or less (YES), the process proceeds to step S6.

Next, in step S6, the comparator 2203 performs arithmetic processing with respect to the distorted waveforms and monitors an operation state of the rolling bearing 1. Specifically, the comparator 2203 retrieves the initial period value and the average period value from the RAM or the like, and determines whether |average period value−initial period value|≤B is satisfied. B is a value for determining whether the lifetime of the rolling bearing 1 is reached, and is determined by experiment or the like. The B is preliminarily stored in the RAM or the like.

In step S6, if | average period value−initial period value-|exceeds B (NO), the process proceeds to step S7, and the comparator 2203 externally outputs an indication that the lifetime of the rolling bearing 1 is reached (data output, generation of a warning sound, lighting of a warning light, or the like). In step S6, if 'average period value−initial period value' is B or less (YES), the process proceeds to step S3 again, and the amplitude calculating unit 2201, the period calculating unit 2202, and the comparator 2203 repeat the above-described operation.

The arithmetic unit 220 may monitor the operation state of the rolling bearing 1 based on any one of the amplitude and the period, or may monitor the operation state of the rolling bearing 1 based on both the amplitude and the period. Comparing average values is used as an example and there is no limitation to the example described above. For example, a given average value and standard deviation may be compared with each other, a maximum value and a minimum value may be compared with each other, and other values may be compared with each other.

In the rolling bearing 1, a preload may be preliminarily applied in order to suppress an axle endplay. As the preload applied to the rolling bearing 1 is greater, the amplitude for the distorted waveform illustrated in FIG. 8 is increased. With use of the relation, reductions in the preload (non-preload) can be detected. For example, when the arithmetic unit 220 calculates average values of amplitudes for the distorted waveform at fixed time period intervals, and a given average value of the amplitudes is less than a threshold that is preset stored in the RAM or the like, it can be detected that the preload is not appropriate (the preload is reduced). If it is detected that the preload is not appropriate, the arithmetic unit 220 externally outputs an indication that the preload is not appropriate (data output, generation of an alarm sound, lighting of the warning light, or the like).

The strain gauge 100 using a Cr composite film as the material of the resistor 103 becomes highly sensitive (500% or more compared to conventional strain gauges) and is made compact (1/10 or less compared to the conventional strain gauges). For example, the output of the conventional strain gauges is about 0.04 mV/2 V, while the output of the strain gauge 100 can be 0.3 mV/2 V or more. Also, the size (gauge length×gauge width) of the conventional strain gauges is about 3 mm×3 mm, while the size (gauge length ×gauge width) of the strain gauge 100 can be reduced to about 0.3 mm×0.3 mm.

As described above, the strain gauge 100 using the Cr composite film as the material of the resistor 103 is made compact, and thus the strain gauge 100 can be easily attached to a desired location of the rolling bearing 1. Also, the strain gauge 100 using the Cr composite film as the material of the resistor 103 is highly sensitive and thus small displacement can be detected. Accordingly, minute strain, which was difficult to be detected in the past, can be detected. In other words, with use of the strain gauge 100 using the Cr composite film as the material of the resistor 103, the rolling bearing 1 having a function of accurately detecting strain can be achieved. As a result, the bearing monitoring apparatus 200 that can detect an operation state of the rolling bearing 1 can be achieved.

In the rolling bearing 1, there might be both cases in which the outer ring 10 rotates and the inner ring 20 rotates. If the outer ring 10 rotates, the strain gauge 100 is disposed on the inner peripheral surface or end surface of the inner ring 20, and if the inner ring 20 rotates, the strain gauge 100 is disposed on the outer peripheral surface or end surface of the outer ring 10.

In this regard, the description above provides an example in which the strain gauge 100 is attached to the outer ring 10, where the inner ring 20 rotates. If the outer ring 10 in the rolling bearing 1 rotates, the strain gauge 100 is attached to the inner ring 20, thereby obtaining the same effect as that described above. The same applies to the following embodiments.

Modification of the First Embodiment

The modification of the first embodiment provides an example of the rolling bearing having the strain gauge, which differs from that according to the first embodiment. In the modification of the first embodiment, the description for the same components as those that have been described in the embodiment may be omitted.

Figure 10:
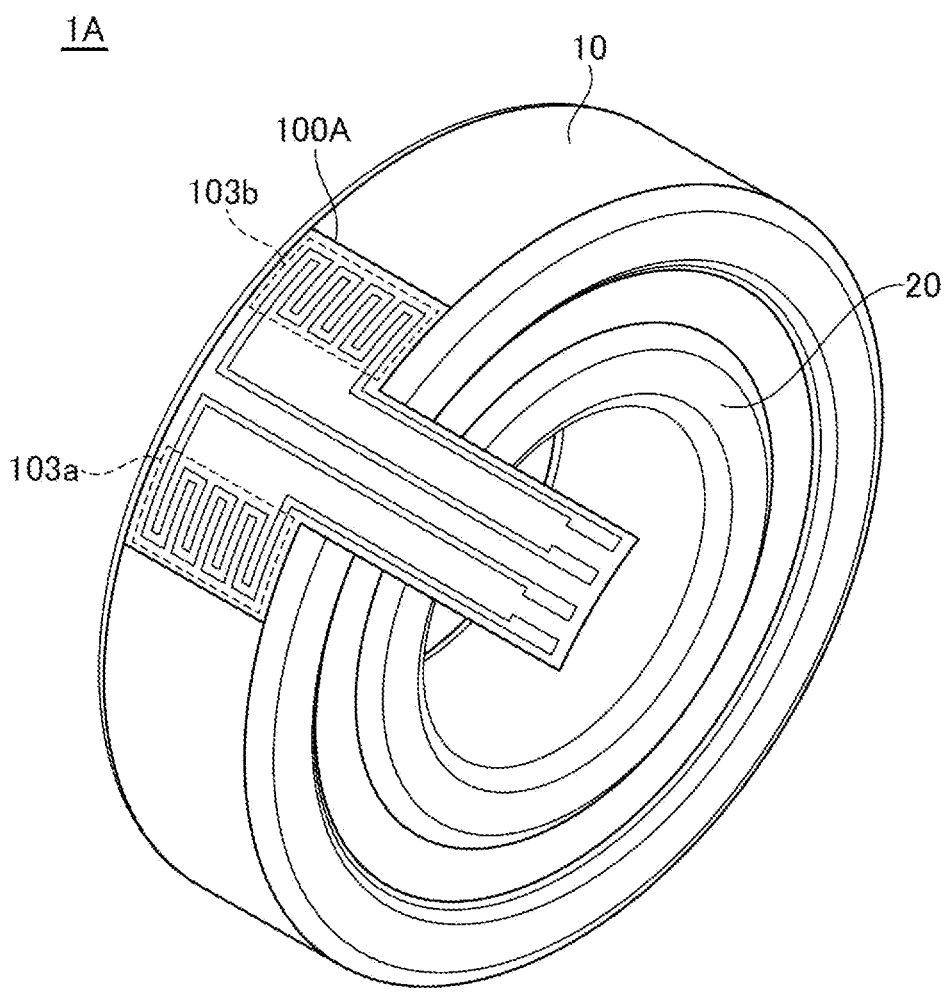
FIG. 10 is a perspective view of an example of the rolling bearing according to a first modification of the first embodiment.
Figure 11:
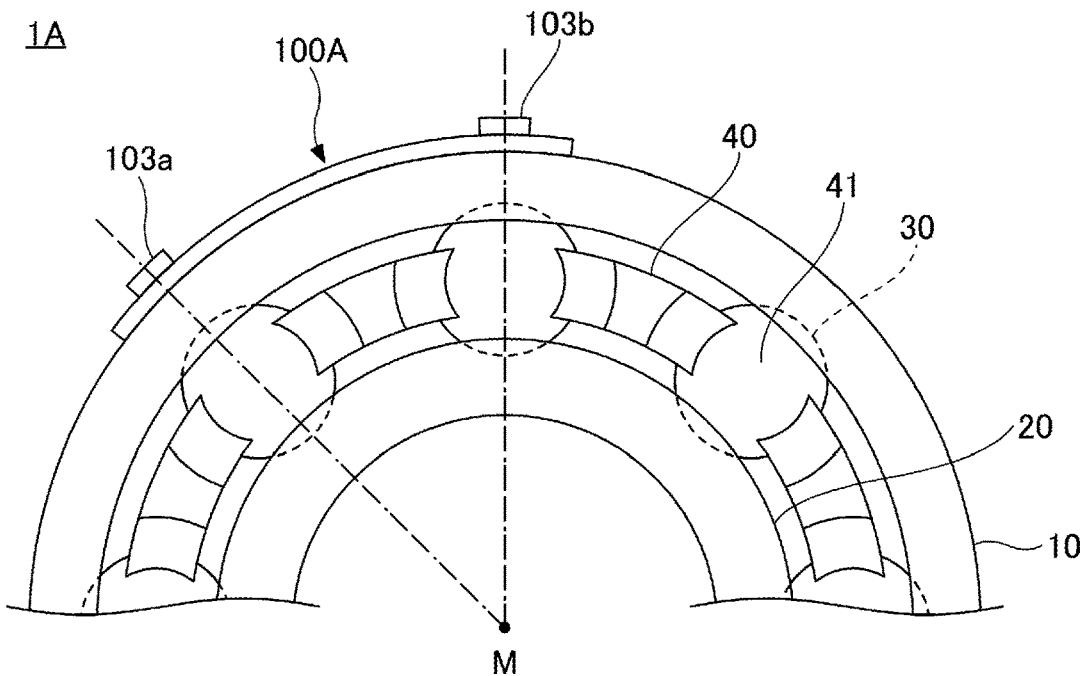
FIG. 11 is a partial front view of an example of the rolling bearing according to the first modification of the first embodiment.

FIG. 10 is a perspective view of an example of the rolling bearing according to a first modification of the first embodiment. FIG. 11 is a partial front view of an example of the rolling bearing according to the first modification of the first embodiment.

Referring to FIG. 10 and FIG. 11, a rolling bearing 1A differs from the rolling bearing 1 (see FIG. 1 and the like) in that a strain gauge 100A is used instead of the strain gauge 100.

The strain gauge 100A includes resistors 103a and 103b that serve as sensitive portions, and the resistors 103a and 103b are arranged in the same direction as an arrangement direction of rolling elements 30, so as to correspond to spacing between the rolling elements 30 that are next to each other. The material, thickness, manufacturing method, and the like of each of the resistors 103a and 103b are adopted as in the resistor 103.

In this description, when the resistors are arranged so as to correspond to the spacing of rolling elements that are next to each other, it means that, when a predetermined resistor-placement region intersects a given one straight line, a resistor-placement region next to the predetermined resistor-placement region is at a location intersecting a given straight line next to the given one straight line, where a rolling bearing including the resistors is not in operation under a condition in which straight lines passing the centers of the respective rolling elements are radially drawn from the rotation axis m of the rolling bearing when the rolling bearing is viewed in a front direction. In this description, the resistor-placement region corresponds to a range defined under a condition of a gauge length×a gauge width. From the viewpoint of detection sensitivity, it is preferable that a given straight line next to a given straight line passes near the center of a corresponding resistor-placement region next to the resistor-placement region.

Also, when resistors are arranged so as to correspond to half spacing between rolling elements that are next to each other, it means that multiple resistors are arranged at a pitch of half that defined in the case described above (example in FIG. 15 and FIG. 16 described below).

Three or more resistors may be arranged in the same direction as the arrangement direction of rolling elements 30 so as to correspond to spacing between rolling elements 30 that are next to each other. When resistors are respectively installed at multiple locations so as to correspond to spacing between the rolling elements 30 that are next to each other, the distorted waveform can be measured at each installation location of a corresponding resistor. In particular, by installing respective resistors at three or more locations, distorted waveforms at installation locations of the resistors can be compared with one another. For example, when distorted waveforms at the respective installation locations of the resistors significantly differ from one another, it can be detected that there is the possibility of misalignment (non-uniform preload or the like) during mounting of a given rolling bearing. Because misalignment results in the possibility of significant reductions in the lifetime of the rolling bearing, a function of performing such detection in advance is useful.

In such a manner, multiple resistors serving as sensitive portions are provided and the resistors may be arranged in the same direction as the arrangement direction of rolling elements 30 so as to correspond to spacing between given rolling elements 30 that are next to each other. For example, by averaging pieces of strain information obtained using resistors, an accurate distorted waveform is obtained.

Figure 12:
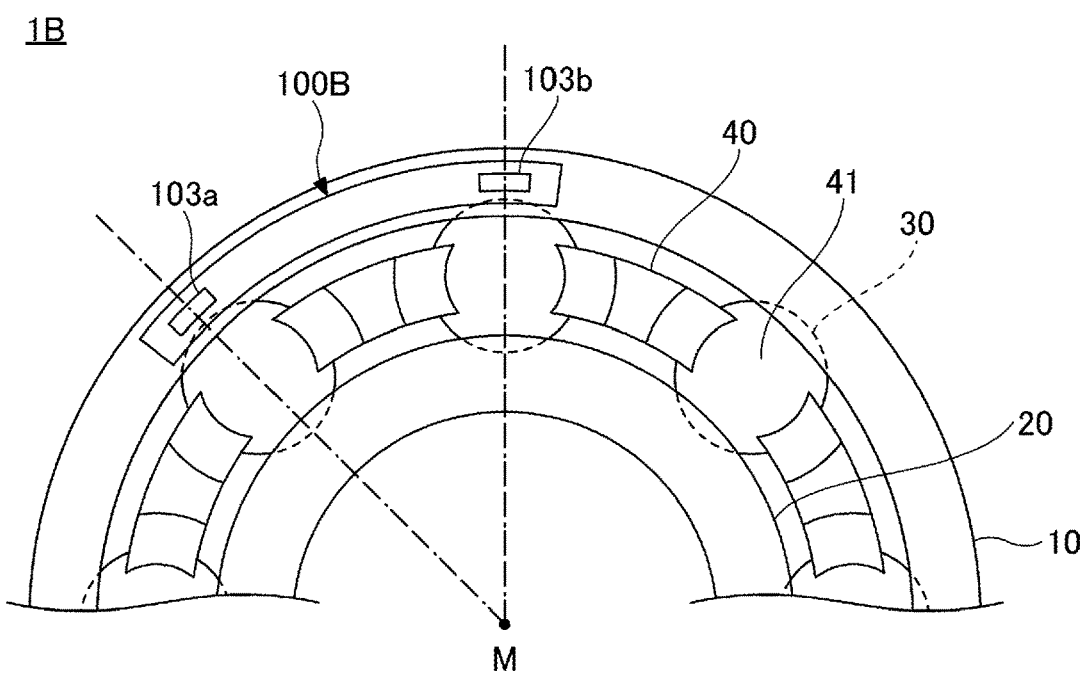
FIG. 12 is a partial front view of an example of the rolling bearing according to a second modification of the first embodiment.

As illustrated in a strain gauge 100B for a rolling bearing 1B in FIG. 12, resistors 103a and 103b may be disposed on one end surface of the outer ring 10, and the resistors 103a and 103b may be arranged in the same direction as the arrangement direction of the rolling elements 30 so as to correspond to spacing between given rolling elements 30 that are next to each other.

Figure 13:
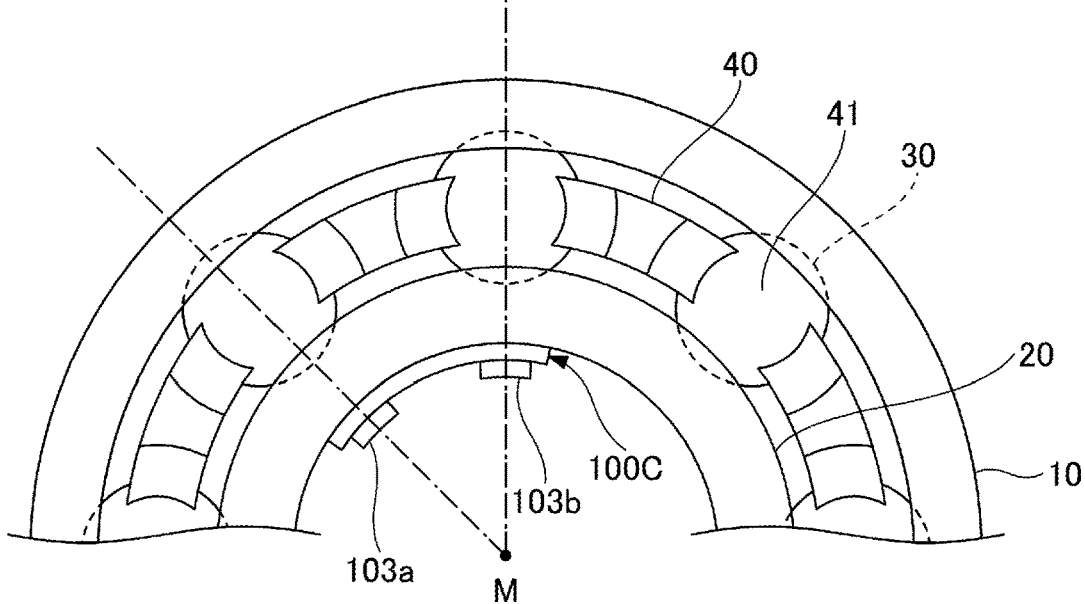
FIG. 13 is a partial front view of an example of the rolling bearing according to a third modification of the first embodiment.

Also, as illustrated in a strain gauge 100C for a rolling bearing 1C in FIG. 13, resistors 103a and 103b may be disposed on an inner peripheral surface of the inner ring 20, and the resistors 103a and 103b may be arranged in the same direction as the arrangement direction of the rolling elements 30 so as to correspond to spacing between given rolling elements 30 that are next to each other.

Figure 14:
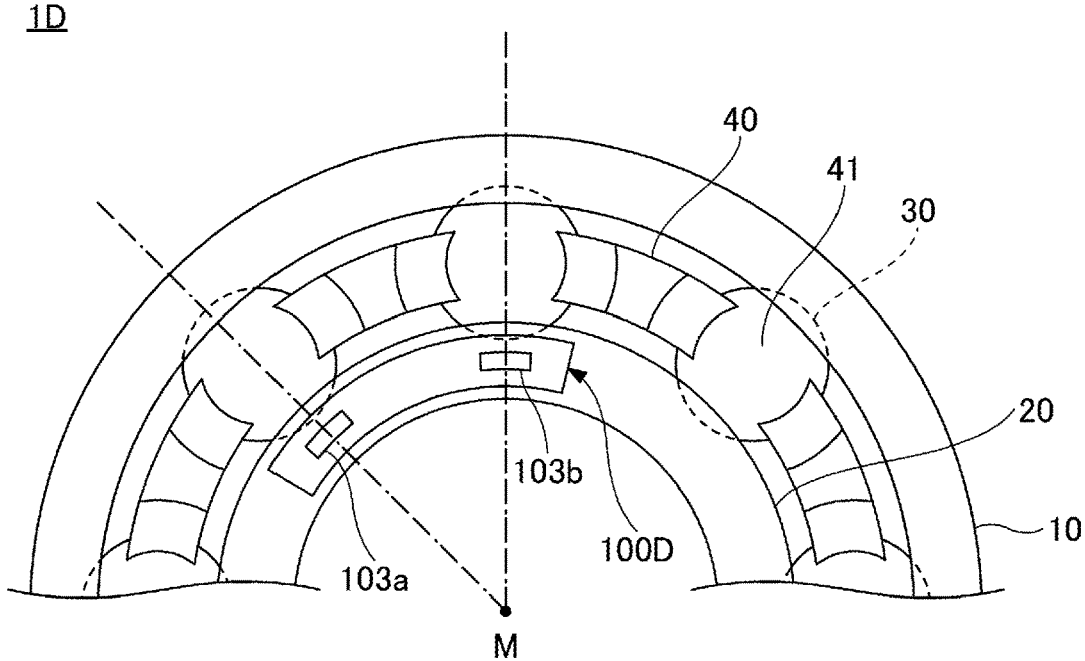
FIG. 14 is a partial front view of an example of the rolling bearing according to a fourth modification of the first embodiment.

As illustrated in a strain gauge 100D for a rolling bearing 1D in FIG. 14, resistors 103a and 103b may be disposed on one end surface of the inner ring 20, and the resistors 103a and 103b may be arranged in the same direction as the arrangement direction of the rolling elements 30 so as to correspond to spacing between given rolling elements 30 that are next to each other.

As described above, in the rolling bearing, there might be both cases in which the outer ring 10 rotates and the inner ring 20 rotates. If a given strain gauge is attached to the inner ring 20 as in FIG. 13 and FIG. 14, the outer ring 10 rotates.

Figure 15:
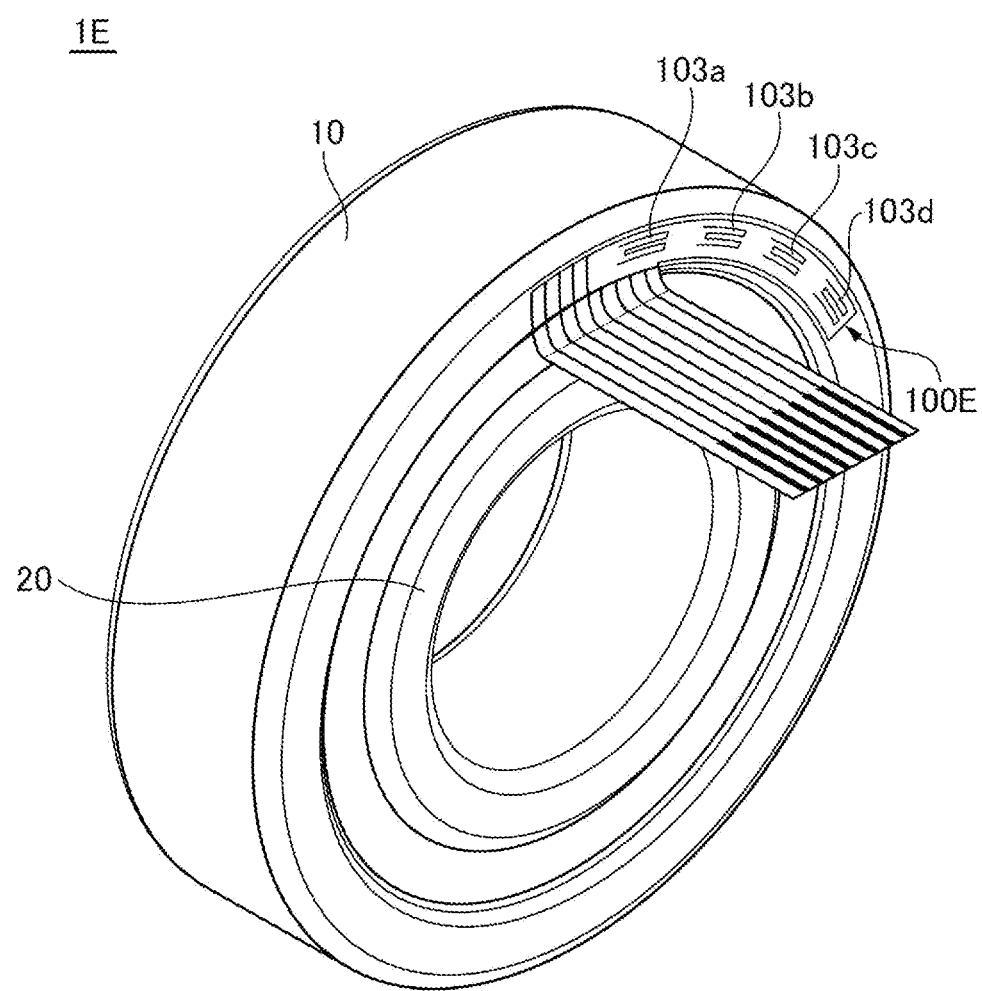
FIG. 15 is a perspective view of an example of the rolling bearing according to a fifth modification of the first embodiment.
Figure 16:
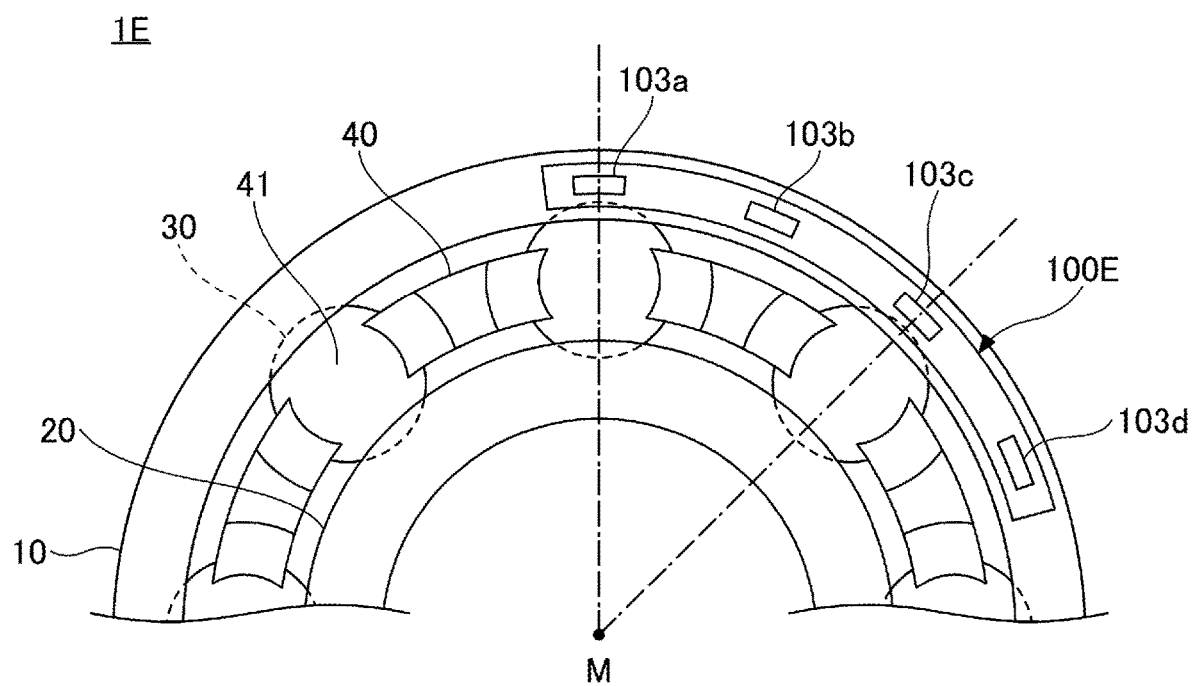
FIG. 16 is a partial front view of an example of the rolling bearing according to the fifth modification of the first embodiment.

FIG. 15 is a perspective view of an example of the rolling bearing according to a fifth modification of the first embodiment. FIG. 16 is a partial front view of an example of the rolling bearing according to the fifth modification of the first embodiment.

Referring to FIGS. 15 and 16, a rolling bearing 1E differs from the rolling bearing 1 (see FIG. 1 and the like) in that a strain gauge 100E is used instead of the strain gauge 100. The strain gauge 100E is disposed in a circumferential direction of the outer ring 10 so as to be along one end surface of the outer ring 10, which differs from a case in which the strain gauge 100 is disposed on the outer peripheral surface of the outer ring 10.

The strain gauge 100E includes resistors 103a, 103b, 103c, and 103d that serve as sensitive portions. The resistors 103a, 103b, 103c, and 103d are arranged in the same direction as the arrangement direction of rolling elements 30 so as to correspond to spacing of half spacing between given rolling elements 30 that are next to each other. The material, thickness, manufacturing method, and the like of each of the resistors 103a, 103b, 103c, and 103d are adopted as in the resistor 103.

For example, when a given rolling element 30 passes the side of each of the resistors 103a and 103c, each of the side of each of resistors 103b and 103d corresponds to an intermediate point between given rolling elements 30 that are next to each other. In this case, the resistors 103a and 103c are used to detect tensile strain of the rolling bearing 1E, and the resistors 103b and 103d are used to detect compressive strain of the rolling bearing 1E.

Respective phases of a waveform detected by the resistors 103a and 103c and a waveform detected by the resistors 103b and 103d are at an offset by approximately 90 degrees. Thus, by constituting a Wheatstone bridge circuit using the resistors 103a, 103b, 103c, and 103d, a distorted waveform having a great amplitude can be obtained. With this arrangement, strain for the rolling bearing 1E can be detected with high accuracy.

The end surface of the outer ring 10 deflects less than the outer peripheral surface thereof, and thus a detectable signal is smaller. However, in the strain gauge 100E, as described above, because the distorted waveform having a great amplitude can be obtained, strain for the rolling bearing 1E can be detected with high accuracy, even if the strain gauge 100E is disposed on the end surface of the outer ring 10.

Note, however, that the strain gauge 100E may be disposed on the outer peripheral surface of the outer ring 10, by properly adjusting the size of the strain gauge. In this case, a distorted waveform having a further great amplitude can be obtained in comparison to a case in which the strain gauge 100E is disposed on a given end surface of the outer ring 10. Therefore, strain for the rolling bearing 15 can be detected with higher accuracy. Alternatively, the strain gauge 100E may be disposed on the inner peripheral surface or one end surface of the inner ring 20, by properly adjusting the size of the strain gauge.

Figure 17:
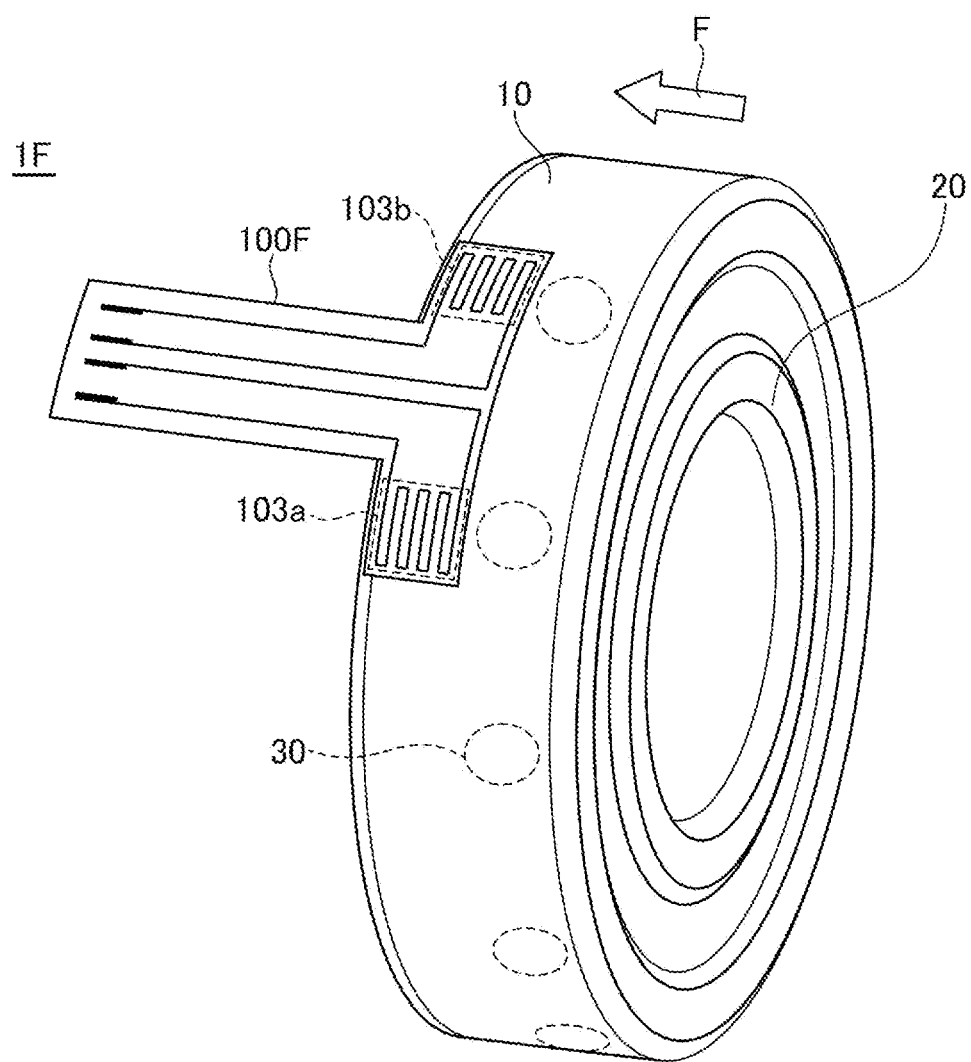
FIG. 17 is a perspective view of an example of the rolling bearing according to a sixth modification of the first embodiment.
Figure 18:
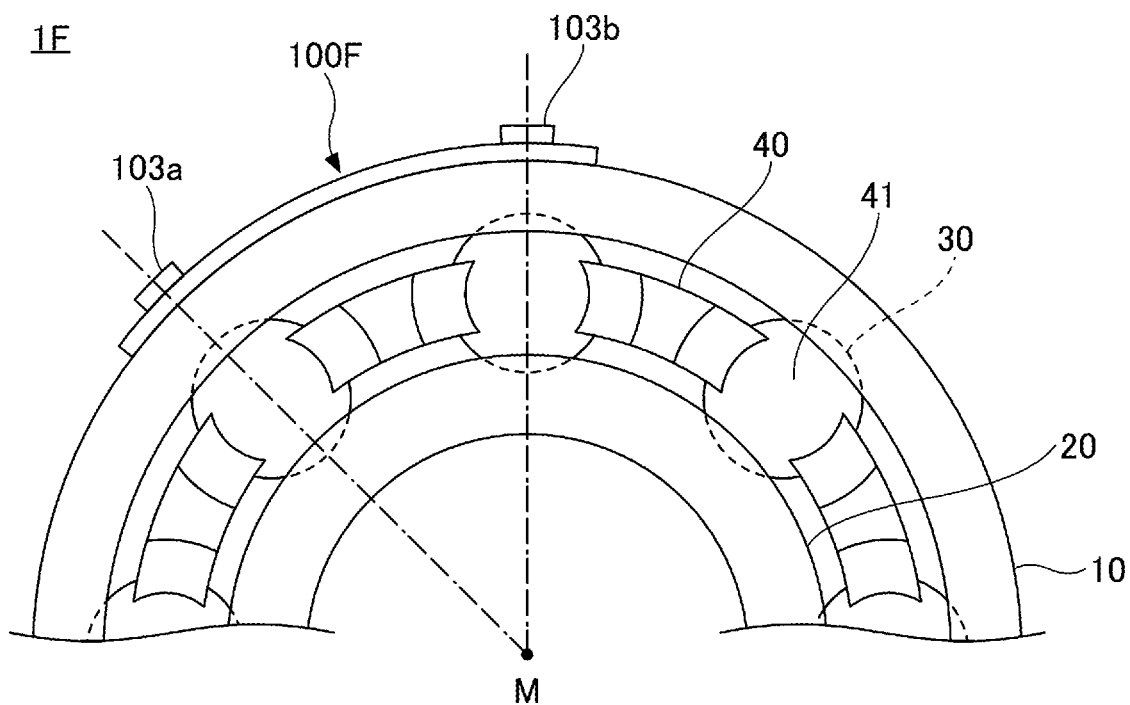
FIG. 18 is a partial front view of an example of the rolling bearing according to the sixth modification of the first embodiment.

FIG. 17 is a perspective view of an example of the rolling bearing according to a sixth modification of the first embodiment. FIG. 18 is a partial front view of an example of the rolling bearing according to the sixth modification of the first embodiment.

Referring to FIGS. 17 and 18, a rolling bearing 1F differs from the rolling bearing 1 (see FIG. 1 and the like) in that a strain gauge 100F is used instead of the strain gauge 100. A preload F is applied to the rolling bearing 1F in a direction, as expressed by the arrow, parallel to the axis of the rolling bearing.

The strain gauge 100F includes resistors 103a and 103b that serve as sensitive portions. The resistors 103a and 103b are arranged in the same direction as the arrangement direction of rolling elements 30, on the side of the outer peripheral surface of the outer ring 10 opposite the preload, so as to correspond to spacing between given rolling elements 30 that are next to each other.

When the rolling bearing 1F is used in a rotating apparatus, the outer peripheral surface of the rolling bearing 1F is held by the inner peripheral surface of a housing (casing) by contact with the inner peripheral surface of a housing. However, an undercut is provided on the housing side, with respect to a providing portion of the strain gauge 100F, such that the strain gauge 100F does not contact the housing.

At the portion of the housing at which the undercut is provided, the outer peripheral surface of the rolling bearing 1F is not held by the inner peripheral surface of the housing, by contact with the inner peripheral surface of the housing. Particularly, when the undercut of the housing is located directly above a given rolling element 30 to which a great force is applied, the outer peripheral surface of the rolling bearing directly above the rolling element 30 is to be greatly distorted. When a particular portion of the outer peripheral surface is greatly distorted, it may result in reductions in a lifetime of the rolling bearing 1F. In view of the point described above, preferably, the outer peripheral surface of the outer ring 10 located directly above a given rolling element 30 is held by the inner peripheral surface of the housing, by contact with inner peripheral surface of the housing, over the whole circumference of the outer ring.

The preload F is applied to the rolling bearing 1F, and thus the rolling elements 30 are distributed toward a direction opposite the direction expressed by the arrow, with respect to a middle portion of the outer ring 10 in a thickness direction of the outer ring. In view of the point described above, under a condition in which the resistors 103a and 103b are disposed on the side of the outer peripheral surface of the outer ring 10 opposite the preload, when undercuts of the housing are respectively provided with respect to only portions of the resistors 103a and 103b, they are sufficient. The outer peripheral surface of the outer ring 10 located directly above the rolling element 30 can be held by the inner peripheral surface of the housing, by contact with the inner peripheral surface of the housing, over the whole circumference of the outer ring.

Instead of providing one or more undercuts on the housing side, a recessed portion at which one or more strain gauges are disposed is also considered to be provided in the outer ring 10 or the inner ring 20.

Greatest strain to be detected by the strain gauge 100F is obtained at the outer peripheral surface of the outer ring 10 that is located directly above each rolling element 30, and small strain is obtained on the side of the outer ring 10 opposite the preload, in comparison to a case of strain obtained directly above each rolling element 30. In such a manner, even if a conventional strain gauge is disposed on the side of the outer peripheral surface of the outer ring 10 opposite the preload, it has been difficult to obtain a distorted waveform. In contrast, the strain gauge 100F using the Cr composite film as each resistor is highly sensitive and thus can detect small displacement. Therefore, even if the strain gauge 100F is disposed on the side of the outer peripheral surface of the outer ring 10 opposite the preload, a distorted waveform can be accurately obtained.

Even in the manner illustrated in FIG. 12, the outer peripheral surface of the outer ring 10 located directly above a given rolling element 30 can be held by the inner peripheral surface of the housing, by contact with the inner peripheral surface of the housing, over the whole circumference of the outer ring. However, the manner illustrated in each of FIGS. 17 and 18 is advantageous over the manner illustrated in FIG. 12, because attachment of the strain gauge is easily performed in comparison to a case of the attachment to the end surface of the outer ring 10, and further a great distorted waveform is obtained in comparison to the case of the attachment to the end surface of the outer ring 10.

Second Embodiment

A second embodiment provides an example of the rolling bearing having the housing outside the outer ring. In the second embodiment, the description for the same components as those that have been described in the embodiment may be omitted.

Figure 19:
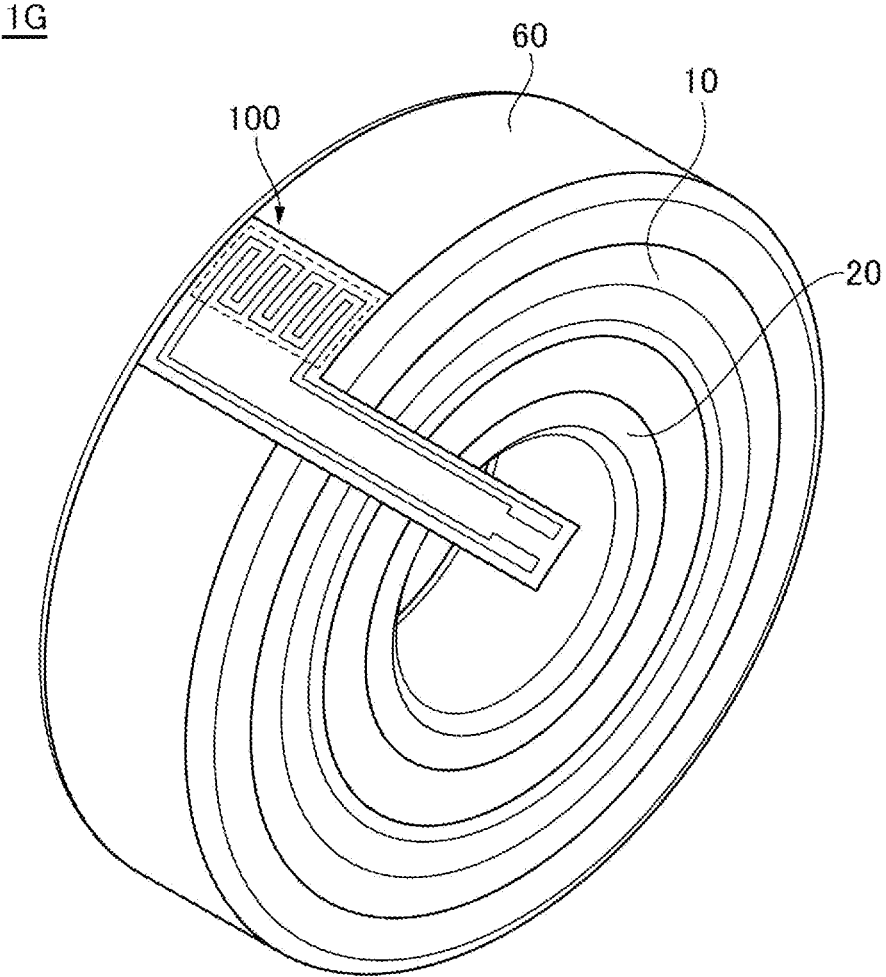
FIG. 19 is a perspective view of an example of the rolling bearing according to a second embodiment.

FIG. 19 is a perspective view of an example of the rolling bearing according to the second embodiment. Referring to FIG. 19, a rolling bearing 1G includes a housing 60 disposed on an outer peripheral side of the outer ring 10, and the strain gauge 100 is disposed on the outer peripheral surface of the housing 60. The housing 60 holds the outer peripheral surface of the outer ring 10 over the whole circumference of the outer ring. The housing 60 can be formed of, for example, brass or the like.

For example, the outer ring 10 has a small diameter (e.g., diameter of about 20 mm) and thus it might be difficult to dispose the strain gauge 100 on the outer ring 10. In such a case, as illustrated in the rolling bearing 1G, when the housing 60 is disposed on the outer peripheral side of the outer ring 10, and the strain gauge 100 is disposed on the outer peripheral surface of the housing 60, arrangement is sufficient. Alternatively, the strain gauge 100 may be disposed on a given end surface of the housing 60. With this arrangement, the strain gauge 100 can be easily disposed. The strain of the outer ring 10 is transferred through the housing 60 to the strain gauge 100 and is detectable by the strain gauge 100.

As described above, the strain gauge 100 using the Cr composite film as the material of the resistor 103 is highly sensitive, and can detect small displacement. Thus, minute strain, which was difficult to be detected in the past, can be detected. In other words, with the strain gauge 100 using the Cr composite film as the material of the resistor 103, the rolling bearing 1G having a function for accurately detecting strain can be achieved. As a result, even when the strain gauge 100 is disposed on the housing 60, a bearing monitoring apparatus 200 that can detect an operation state of the rolling bearing 1G can be provided.

The shape of the housing is not limited to an annular shape, and any shape may be adopted. Alternatively, when the rolling bearing 1G is used in a rotating apparatus such as a fan motor, the housing 60 may also serve as a housing for the rotating apparatus. In other words, in a rotating apparatus having a rolling bearing, a given strain gauge may be disposed on an outer peripheral surface or end surface of the housing for the rotating apparatus.

Although the preferred embodiments have been described in detail above, various modifications or substitutions to the embodiments described above can be made without departing from the scope set forth in the claims.

This International Application claims priority to Japanese Patent Application No. 2019-115678, filed Jun. 21, 2019, the contents of which are incorporated herein by reference in their entirety.

REFERENCE SIGNS LIST

1A, 1B, 1C, 1D, 1E, 1F, 1G rolling bearing, 10 outer ring, 11, 21, 41 recessed portion, 20 inner ring, 30 rolling element, 40 holder, 42 back surface, 51, 52 seal, 60 housing, 70 race, 100, 100A, 100B, 100C, 100D, 100E, 100F strain gauge, 101 substrate, 101a upper surface, 102 functional layer, 103, 103a, 103b, 103c, 103d resistor, 104 line, 105 terminal section, 106 cover layer, 200 bearing monitoring apparatus, 210 analog front end, 211 bridge circuit, 212 amplifier circuit, 213 A/D converter circuit, 214 interface, 220 arithmetic unit, 2201 amplitude calculating unit, 2202 period calculating unit, 2203 comparator

The invention claimed is:

1. A rolling bearing comprising:
   an outer ring having an outer peripheral surface;
   an inner ring disposed coaxially with the outer ring, the inner ring being on an inner peripheral side of the outer ring;
   multiple rolling elements disposed between the outer ring and the inner ring; and
   a strain gauge configured to detect strain of the outer ring,
   wherein the strain gauge includes at least one resistor formed of a Cr composite film,
   wherein the outer peripheral surface of the outer ring includes a first side, and a second side opposite the first side,
   wherein the second side is opposite a side of the rolling bearing at which a preload is applied,
   wherein the resistor is disposed on the second side of the outer peripheral surface of the outer ring, and
   wherein the resistor is disposed above the outer peripheral surface of the outer ring.

2. The rolling bearing according to claim 1, wherein the multiple rolling elements are circumferentially spaced apart from one another around a rotation axis of the rolling bearing, and
   wherein the at least one resistor includes two resistors arranged on respective radial lines that extend from the rotation axis, the radial lines being angularly spaced apart about the rotation axis such that an angle between the radial lines corresponds to angular spacing between adjacent rolling elements among the multiple rolling elements.

3. The rolling bearing according to claim 1, wherein the multiple rolling elements are circumferentially spaced apart from one another around a rotation axis of the rolling bearing, and
wherein the at least one resistor includes four resistors arranged on respective radial lines that extend from the rotation axis, the radial lines being angularly spaced apart about the rotation axis such that an angle between adjacent radial lines among the radial lines corresponds to half angular spacing between adjacent rolling elements among the multiple rolling elements.

4. The rolling bearing according to claim 1, wherein the at least one resistor is arranged such that a longitudinal direction of the resistor is directed to a circumferential direction of the outer ring.

5. The rolling bearing according to claim 1, wherein the outer peripheral surface of the outer ring is continuously cylindrical.

6. A rotating apparatus comprising the rolling bearing according to claim 1.

7. A bearing monitoring apparatus comprising:
a rolling bearing according to claim 1;
a waveform generator configured to generate a distorted waveform based on an output of the resistor; and
circuitry configured to
    perform arithmetic processing with the distorted waveform to monitor an operation state of the rolling bearing,
    determine at least one of an amplitude or a time period of the distorted waveform,
    compare the at least one of the amplitude or the time period with a threshold, and
    determine whether a lifetime of the rolling bearing is reached based on a result of comparison.

8. A method for monitoring a bearing, the method comprising:
generating a distorted waveform based on an output of the resistor in a rolling bearing according to claim 1; and
performing arithmetic processing with the distorted waveform to monitor an operation state of the rolling bearing.

9. The method for monitoring a bearing according to claim 8, wherein the monitoring of the operation state of the rolling bearing is performed based on at least one among an amplitude and a period of the distorted waveform.

10. A rolling bearing comprising:
an outer ring having an outer peripheral surface;
an inner ring disposed coaxially with the outer ring, the inner ring being on an inner peripheral side of the outer ring;
multiple rolling elements disposed between the outer ring and the inner ring;
a strain gauge configured to detect strain of the outer ring; and
a housing having an inner peripheral surface and disposed in contact with an outer periphery of the outer ring,
wherein the strain gauge includes at least one resistor formed of a Cr composite film,
wherein the outer peripheral surface of the outer ring includes a first side, and a second side opposite the first side,
wherein the second side is opposite a side of the rolling bearing at which a preload is applied,
wherein the resistor is disposed on the second side of the outer peripheral surface of the outer ring,
wherein the resistor is disposed above the outer peripheral surface of the outer ring, and
wherein the inner peripheral surface of the housing is in contact with the outer peripheral surface of the outer ring that is located directly above the multiple rolling elements, over the whole circumference of the outer ring.

11. The rolling bearing according to claim 10, wherein the outer peripheral surface of the outer ring is continuously cylindrical.

* * * * *